United States Patent [19]

Crosky

[11] 4,181,448

[45] Jan. 1, 1980

[54] COMBINATION ROADWAY AND PIPELINE WAY IN PERMAFROST REGIONS

[75] Inventor: Robert A. Crosky, Anchorage, Ala.

[73] Assignee: Atlantic Richfield Company, Los Angeles, Calif.

[21] Appl. No.: 945,672

[22] Filed: Sep. 25, 1978

[51] Int. Cl.² ............................................. E01C 3/00
[52] U.S. Cl. ............................................ 404/27; 404/3
[58] Field of Search .................. 404/3, 2, 1, 27, 17, 404/18, 72, 71, 28

[56] References Cited

U.S. PATENT DOCUMENTS

| 245,721 | 8/1881 | Henning | 404/2 |
|---|---|---|---|
| 358,778 | 3/1887 | Holt | 404/3 |
| 744,878 | 11/1903 | Sayre | 404/27 |
| 2,082,429 | 6/1937 | Sterns | 404/2 |
| 2,420,833 | 5/1947 | Monroe | 404/28 X |
| 3,272,096 | 9/1966 | Lum | 404/3 X |
| 3,279,334 | 10/1966 | Quartararo | 404/31 |
| 3,503,425 | 3/1970 | Holm | 404/3 X |
| 3,626,702 | 12/1971 | Monahan | 404/28 X |
| 3,839,518 | 10/1974 | Rubens | 404/27 X |
| 3,880,538 | 4/1975 | Burt | 404/28 |

Primary Examiner—Nile C. Byers, Jr.
Attorney, Agent, or Firm—Roderick W. MacDonald

[57] ABSTRACT

A combination roadway and pipeline way for use over permafrost comprising a roadbed and at least one pipeline embedded in a side area of the roadbed, insulation means carried between the pipeline and permafrost and extending laterally from both sides of the pipeline a distance sufficient to prevent substantial amounts of heat radiation from passing from the pipeline around the edges of the insulation means and into the permafrost.

9 Claims, 2 Drawing Figures

COMBINATION ROADWAY AND PIPELINE WAY IN PERMAFROST REGIONS

BACKGROUND OF THE INVENTION

Heretofore in laying pipelines over permafrost regions, in order to prevent melting the permafrost by heat transfer from the pipeline, the pipeline have been either elevated in the air or buried in the permafrost and cooled by artificial means.

Although supporting pipelines over permafrost, or providing permafrost cooling by artificial means in the buried case, is very good for maintaining the permafrost frozen even in summer months, it can be desirable in some situations for aesthetic, environmental, or even operational purposes to have the pipeline buried in roadways or berms constructed for this purpose.

SUMMARY OF THE INVENTION

According to this invention, one or more pipelines can be essentially buried yet without disturbing or thawing the underlying permafrost, even in summer.

Accordingly, it is an object of this invention to provide a new and improved method for laying pipelines in permafrost regions.

Other aspects, objects and advantages of this invention will be apparent to those skilled in the art from this disclosure and the appended claims.

DETAILED DESCRIPTION OF THE INVENTION

Figure 1:
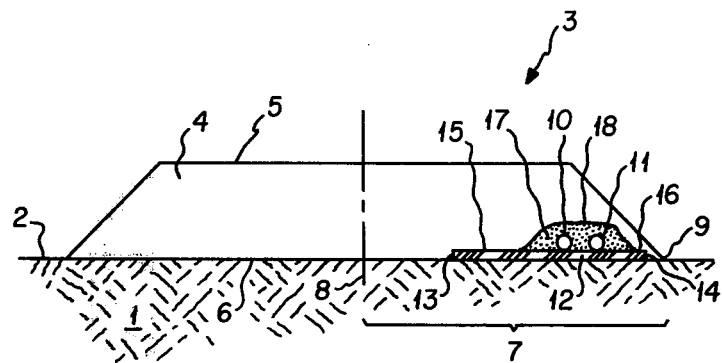
FIG. 1 shows a cross-sectional view of the combination roadway and pipeline way of this invention.

More specifically, FIG. 1 shows permafrost 1 whose upper surface 2 has a combination roadway and pipeline way 3 thereon. Roadway 4 is a trapezoidal shaped pile of material such as gravel or any other desired roadway construction material with an upper travel surface 5 and bottom surface 6 which contacts the surface 2 of permafrost 1. Side area 7 of the roadway, which side area can extend from the center 8 of the roadway to the outer edge 9 of the roadway, but preferably is closer to outer edge 9 than center 8, carries embedded therein at least one pipeline shown in FIG. 1 as two separate pipelines 10 and 11.

Roadbed 4 is longitudinally extending as are all roads and, similarly, pipelines 10 and 11 are also longitudinally extending and are essentially longitudinally parallel to the longitudinal axis of roadbed 4. Longitudinally extending insulation means 12, with its longitudinal edges 13 and 14, is carried in roadbed 4 and between the underside of pipelines 10 and 11 and the upper surface 2 of permafrost 1. Edges 13 and 14 are laterally displaced beyond the outer sides of pipelines 10 and 11 by distances 15 and 16, respectively. Distances 15 and 16 are sufficient in length (based on the dimensions of the materials and other physical characteristics of the specific structure) to prevent substantial amounts of heat radiation from passing from pipelines 10 and/or 11 around edges 13 and 14 and into permafrost 1.

If desired, pipelines 10 and 11 are surrounded by a particulate bed of material 17 which is finer in particle size than the material of roadbed 4 and provides a better bed for the pipelines. If the pipelines are insulated around their outer surface, as is often the case, it can be desirable to employ bed 17 because the finer particulate matter making up bed 17 will be less likely to pierce or otherwise damage the insulation on the pipelines than the coarser material in roadbed 4. Thus, pipeline bed 17 can be employed for better load distribution and/or protection of the pipeline or pipelines contained therein.

To better maintain bed 17 around pipelines 10 and 11, bed 17 can be surrounded by a longitudinally extending containment means 18 which is perforated for drainage of water or other liquids therethrough. The shielding protection provided by pipeline bed 17 can also help eliminate the need for corrosion protection. Whether or not pipeline bed 17 is employed, corrosion protection for the pipeline can be used.

Insulation 12 can be any well known thermal insulation such as polystyrene foam, or other material suitable for the purpose intended, and serves the desirable function of thermally insulating the pipelines from the permafrost by reflecting heat up towards the upper surfaces of the roadbed. Additionally, such insulation substantially retards the formation of ground water thermosyphons which increase heat transfer from the pipelines by convection.

Figure 2:
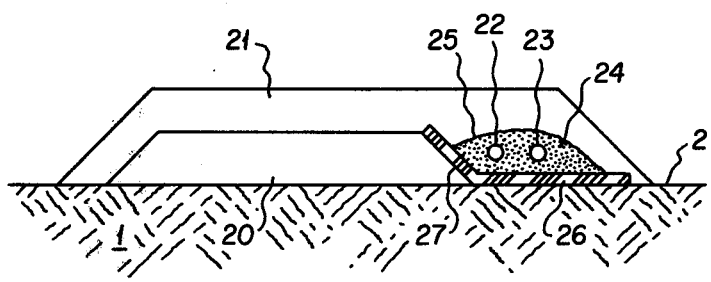
FIG. 2 shows a cross-sectional view of the combination roadway and pipeline way of this invention when built over a prior existing roadbed.

FIG. 2 shows permafrost 1 with upper surface 2 wherein a previously existing or prior roadbed 20 was already in place and over which was constructed new roadbed 21. Roadbed 21 contains in its side area, (which is outside prior roadbed 20) pipelines 22 and 23. Pipelines 22 and 23 are surrounded by fine particulate pipeline bed 24 contained in perforated containment means 25. Pipeline bed 24 rests upon insulation means 26 which is curved upwardly on inner side 27 to conform to the outside slope of pre-existing roadbed 20.

EXAMPLE

A roadbed is constructed essentially as shown in FIG. 2 wherein each pipeline is surrounded on its outer surface by polyurethane insulation which in turn is encased on its outer surface by a polyethylene jacket. The pipelines are completely surrounded by sand and enclosed in a perforated containment means and supported on a foamed polystyrene insulation means 26. The remainder of roadbed 21 is formed from gravel.

Reasonable variations and modifications are possible within the scope of this disclosure without departing from the spirit and scope of this invention.

The embodiments of this invention in which an exclusive property or privilege is claimed are defined as follows:

1. A combination roadway and pipeline way for use over permafrost comprising a longitudinally extending roadbed whose bottom area rests on said permafrost, at least one longitudinally extending pipeline embedded in a side area of said roadbed and extending essentially parallel to said roadbed, longitudinally extending insulation means having longitudinal edges, said insulation means being carried in said roadbed between said pipeline and said permafrost, said insulation means extending laterally from both sides of said pipeline a distance sufficient to prevent substantial amounts of heat radiation from passing from said pipeline around said edges of said insulation means and into said permafrost.

2. A combination roadway and pipeline according to claim 1 wherein said pipeline is carried surrounded in a bed of fine particulate matter.

3. A combination roadway and pipeline according to claim 2 wherein said particulate matter is essentially sand.

4. A combination roadway and pipeline according to claim 2 wherein said particulate matter is surrounded by a longitudinally extending containment means which is perforated for drainage.

5. A combination roadway and pipeline according to claim 1 wherein said roadbed is built over a prior roadbed and said pipeline is laid essentially parallel to the outer edge of said prior roadbed and outside said prior roadbed, said prior roadbed and pipeline being both covered by said roadbed.

6. A combination roadway and pipeline according to claim 5 wherein said pipeline is carried surrounded in a bed of fine particulate matter.

7. A combination roadway and pipeline according to claim 6 wherein said particulate matter is essentially sand.

8. A combination roadway and pipeline according to claim 5 wherein said particulate matter is surrounded by a longitudinally extending containment means which is perforated for drainage.

9. A combination roadway and pipeline according to claim 1 wherein said pipeline is insulated on its outer surface.

* * * * *